(12) United States Patent
Vopni et al.

(10) Patent No.: US 9,672,028 B1
(45) Date of Patent: Jun. 6, 2017

(54) DEVICE MANAGEMENT SYSTEM, APPARATUS AND METHOD FOR NOTIFICATION AND SCHEDULING OF FIRMWARE UPDATE

(71) Applicants: Jim Vopni, Kitchener (CA); Steven Derouchie, Kitchener (CA)

(72) Inventors: Jim Vopni, Kitchener (CA); Steven Derouchie, Kitchener (CA)

(73) Assignee: RICOH COMPANY, LTD., Tokyo (JP)

( * ) Notice: Subject to any disclaimer, the term of this patent is extended or adjusted under 35 U.S.C. 154(b) by 0 days.

(21) Appl. No.: 14/946,228

(22) Filed: Nov. 19, 2015

(51) Int. Cl.
*G06F 9/445* (2006.01)

(52) U.S. Cl.
CPC ..................................... *G06F 8/65* (2013.01)

(58) Field of Classification Search
None
See application file for complete search history.

(56) References Cited

U.S. PATENT DOCUMENTS

| | | | |
|---|---|---|---|
| 6,199,204 | B1 | 3/2001 | Donohue |
| 9,007,631 | B2 | 4/2015 | Hagiwara |
| 2012/0036552 | A1* | 2/2012 | Dare ............... H04L 41/0253 726/1 |
| 2012/0062944 | A1 | 3/2012 | Nakamoto |
| 2012/0265865 | A1 | 10/2012 | Tanaka et al. |
| 2012/0266073 | A1 | 10/2012 | Tanaka et al. |
| 2014/0222989 | A1 | 8/2014 | Tanaka et al. |
| 2014/0223512 | A1 | 8/2014 | Hagiwara et al. |

FOREIGN PATENT DOCUMENTS

| | | |
|---|---|---|
| JP | 2004-234056 | 8/2004 |
| JP | 2005-228200 | 8/2005 |

OTHER PUBLICATIONS

U.S. Appl. No. 13/086,608, Shun Tanaka Tom Haapanen Jim Vopni, Device Management System, Pending (US 2012/0265865 A1).
U.S. Appl. No. 13/086,779, Shun Tanaka Tom Haapanen Jim Vopni, Device Management System Including Reporting Server, Pending (US 2012/0266073 A1).
U.S. Appl. No. 13/758,089, Kenji Hagiwara Jim Vopni Shun Tanaka, Customizing Security Role in Device Management System, Apparatus and Method, Pending (US 2014/0223512 A1).
U.S. Appl. No. 13/758,103, Shun Tanaka Jim Vopni, Management of Device Management Units, Pending (US 2014/0222989 A1).
International Search Report and Written Opinion of the International Searching Authority in corresponding international application No. PCT/JP2016/004872.

* cited by examiner

*Primary Examiner* — Chuck Kendall
(74) *Attorney, Agent, or Firm* — Cooper & Dunham LLP

(57) ABSTRACT

Systems, apparatuses and methodologies are provided to facilitate firmware update to devices amongst a fleet of managed devices, including scheduling tasks for performing such firmware update to specified devices.

19 Claims, 19 Drawing Sheets

Device Firmware

Detailed Information

| Device Display Name | Manufacturer Name | Model Name | Network MAC Address | Firmware: Current Version | Firmware: Latest Version | Firmware: Release Notes | Firmware Update Type |
|---|---|---|---|---|---|---|---|
| Executive MFP | Ricoh | MP 2564 | 00-26-73-47-05-49 | 1.09 | 1.10 | Yes | Enhancement |
| Carol's MFP | Epson | Workforce | 00-26-73-55-84-28 | 2.12 | 2.15 | Yes | Security |
| Jim's Printer | HP | ENVY 4520 | 00-00-74-83-87-A8 | 1.01 | 1.04 | No | Critical |

Fig. 8B

| Device Display Name | Manufacturer Name | Model Name | Network MAC Address | Firmware Current Version | Release Date | Firmware Latest Version | Release Date |
|---|---|---|---|---|---|---|---|
| Conference Room MFP | Ricoh | Aficio 161 | 00-00-74-EA-BC-89 | 2.02 | 09/25/2010 | 2.02 | 09/25/2010 |
| Executive MFP | Ricoh | MP 2564 | 00-26-73-47-D5-A9 | 1.09 | 02/15/2009 | 1.10 | 09/25/2015 |
| Mailroom Printer | Xerox | Phaser 55 | 00-26-73-86-D9-95 | 1.08 | 05/31/2014 | 1.08 | 05/31/2014 |
| Carol's MFP | Epson | Workforce | 00-26-73-55-84-28 | 2.12 | 11/08/2008 | 2.15 | 12/25/2014 |
| Basement Printer | Canon | Inkjet 93 | 00-26-73-7A-04-D0 | 2.25 | 07/10/2011 | 2.25 | 07/10/2011 |
| Jim's Printer | HP | ENVY 4520 | 00-00-74-B3-87-AB | 1.01 | 06/02/2015 | 1.04 | 10/10/2015 |

Fig. 8C

Device Management Application

Device List

View: Firmware ▽

| Device Display Name | Manufacturer Name | Model Name | Network MAC Address | Firmware Current Version | Firmware Release Date | Firmware Latest Version | Firmware Release Date |
|---|---|---|---|---|---|---|---|
| Conference Room MFP | Ricoh | Aficio 161 | 00-00-74-EA-BC-89 | 2.02 | 09/25/2010 | 2.02 | 09/25/2010 |
| Executive MFP | Ricoh | MP 2564 | 00-26-73-47-D5-A9 | 1.09 | 02/15/2009 | 1.10 | 09/25/2015 |
| Mailroom Printer | Xerox | Phaser 55 | 00-26-73-86-D9-95 | 1.08 | 05/31/2014 | 1.08 | 05/31/2014 |
| Carol's MFP | Epson | Workforce | 00-26-73-55-84-28 | 2.12 | 11/08/2008 | 2.15 | 12/25/2014 |
| Basement Printer | Canon | Inkjet 93 | 00-26-73-7A-04-D0 | 2.25 | 07/10/2011 | 2.25 | 07/10/2011 |
| Jim's Printer | HP | ENVY 4520 | 00-00-74-B3-87-AB | 1.01 | 06/02/2015 | 1.04 | 10/10/2015 |

DEVICE MANAGEMENT SYSTEM, APPARATUS AND METHOD FOR NOTIFICATION AND SCHEDULING OF FIRMWARE UPDATE

TECHNICAL FIELD

This disclosure relates to device management systems, apparatuses and methodologies, and more specifically, to such systems, apparatuses and methodologies to facilitate firmware update to devices amongst a fleet of managed devices.

BACKGROUND

In the current information age, information technology (IT) tools are extensively used in enterprises and other organizations in order to facilitate processing of documents and data. IT management tools (such as application software) are available to IT administrators to assist the administrators with monitoring, managing and maintaining IT assets, such as network-connected devices [e.g., computers, printers, scanners, multi-function devices, etc.]. The number of IT devices within a managed environment is generally increasing and IT administrators are often required to oversee a growing number of IT assets.

Firmware is a type of programming for control, monitoring and sometimes even data processing, on an electronic device and is typically held in non-volatile memory such as ROM, EPROM, flash memory, etc. Some firmware may only provide services to higher-level software, and some other firmware may be the only program that runs on the device. Device firmware may be changed or updated to fix bugs in the program or to add, enhance or modify device functionalities. In the typical enterprise environment, IT administrators need to manually check for firmware updates, download them, and apply them to each device. Such conventional approach for firmware update can be highly burdensome and requires the administrator to exercise a high level of repetitious mental and manual activities.

SUMMARY

Various tools (for example, a system, application software, a method, etc.) can be provided to administrators to automate a firmware update process while still maintaining control over which firmware is installed.

For example, a device management apparatus (e.g., an internal server) can be configured to communicate with a firmware source (e.g., a server in the cloud) and retrieve the latest firmware for assorted devices in the managed environment, from the firmware source, when the firmware becomes available, and to notify the administrator of new firmware, including provide release notes along with a link to schedule devices for firmware updates.

Further, in such example, a repository may be maintained to register firmware for each unique device model installed in the managed environment. When a firmware version that is available from a firmware source is a newer version than that registered in the repository, such newer firmware version is downloaded and registered in the repository. When the device management apparatus downloads such newer firmware version, the apparatus checks the version of firmware on each managed device to which the firmware can be applied, and a notification email is sent to the administrator to notify of the new firmware. Such notification can contain (a) release notes for the firmware, (b) update type indicating whether the firmware is Enhancement, Critical, or Security, and (c) a link to a task scheduling page to create a task for updating devices that have out of date firmware.

In another aspect, the device management apparatus may provide a user interface page or pane and/or a report that provides various device information, including for each device, for example, an indication that the installed firmware is the latest firmware version (and optionally version number and release date of such version), or if the installed firmware is not the latest firmware version, the current version of the firmware that is installed on the device and the latest version that is available from the firmware source (or that has been downloaded and registered in the repository) including optional the update type. When such information is presented in a device information page or pane and viewed by the administrator, the administrator may be permitted to proceed to schedule a firmware update task, via a scheduling page or pane. Alternatively or additionally, the user interface provided by the device management apparatus may permit the administrator to view the contents of the firmware repository and proceed therefrom to the task scheduling page or pane to schedule a firmware update task for updating specified devices.

In another aspect, the task scheduling page or pane provided by the device management apparatus for scheduling a firmware update task may only show devices that have not already had the firmware update performed thereon. For example, the scheduling page or pane provided by the device management apparatus may provide a list of the managed devices that employ the aforementioned firmware that has not been updated, and for each device amongst the listed devices, provides a corresponding user interface part to permit selection of the device for firmware update. After selection of one or more of the listed devices via such user interface parts, the scheduling page or pane provided by the device management apparatus permits the administrator to specify a date and time for the firmware update to the selected devices.

In another aspect, the firmware update may include a plurality of components, and the release notes in the notification includes, for each component amongst the plurality of component, remarks regarding the component. Further, the scheduling page or pane provided by the device management apparatus may permit the administrator to select one or more components amongst the plurality of components and create a firmware update package constituted by the selected components and without any unselected components. Such firmware update package is executed at the specified date and time to update the selected devices.

BRIEF DESCRIPTION OF THE DRAWINGS

The aforementioned and other aspects, features and advantages can be more readily understood from the following detailed description with reference to the accompanying drawings wherein:

FIGS. 8A-8J show respective examples of user interface views provided on a terminal apparatus, according to an exemplary embodiment, or on the device management apparatus in the system shown in FIG. 1A or in the system shown in FIG. 1B.

DETAILED DESCRIPTION

Figure 1A:
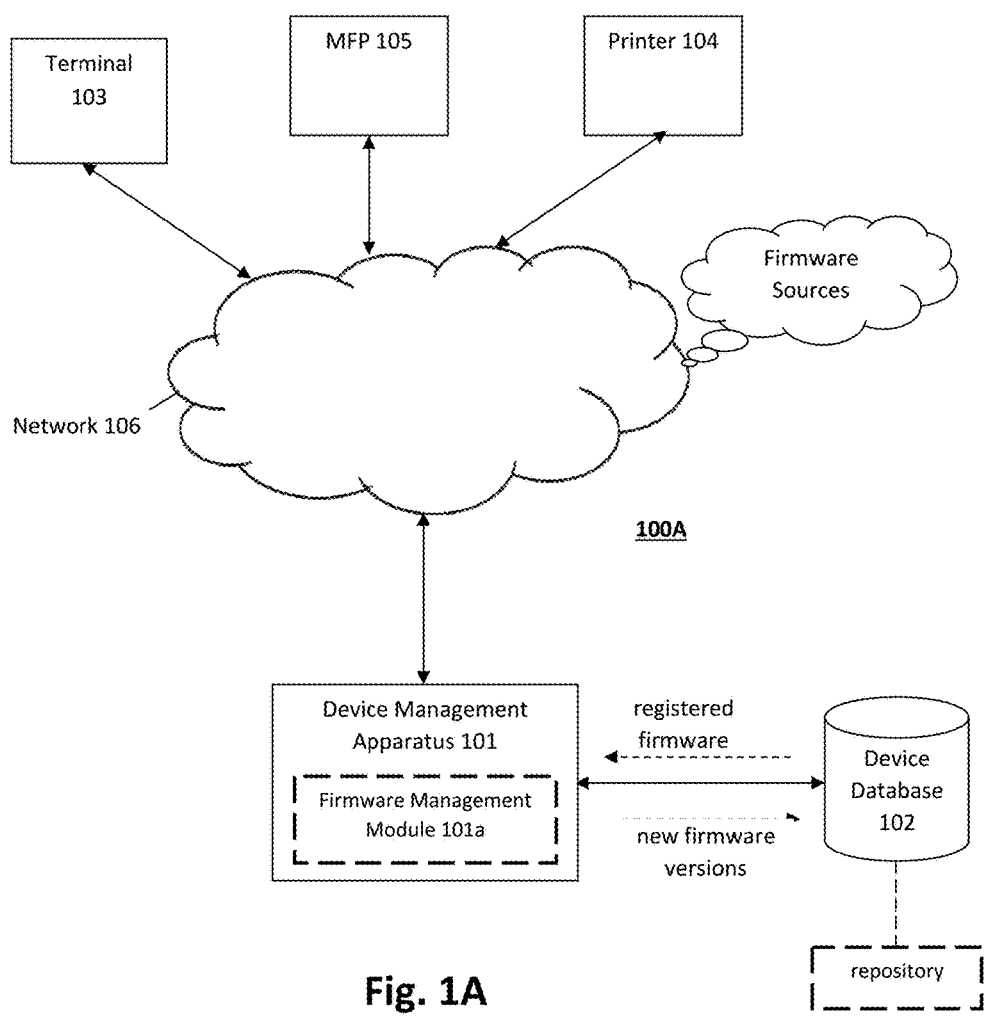
FIG. 1A shows a block diagram of a system in which a device management apparatus performs various tasks, including scheduled firmware updates, according to an exemplary embodiment.

In describing preferred embodiments illustrated in the drawings, specific terminology is employed for the sake of clarity. However, the disclosure of this patent specification is not intended to be limited to the specific terminology so selected and it is to be understood that each specific element includes all technical equivalents that operate in a similar manner. In addition, a detailed description of known functions and configurations will be omitted when it may obscure the subject matter of the present invention.

Various device management tools are discussed herein to facilitate firmware update to managed devices. It should be appreciated by those skilled in the art that any one or more of such tools may be embedded in application software and/or in any of various other ways and thus while various examples are discussed herein, the inventive subject matter of this disclosure is not limited to such examples described herein.

Referring now to the drawings, wherein like reference numerals designate identical or corresponding parts throughout the several views, FIG. 1A shows schematically a system 100A that includes a device management apparatus 101, a terminal 103, a printer 104 and an MFP 105, all of which are interconnected by a network 105.

The device management apparatus 101 maintains device database 102 and manages devices (e.g., printer 104, MFP 105, etc.) that are connected to the network 105. For example, the device management apparatus 101 may communicate with each of the managed devices to obtain information regarding the status of each of the managed devices.

The firmware management module 101a locates firmware that is retrievable from firmware sources connected to the network 105. More specifically, the firmware management module 101a maintains (or at least accesses) device data in device database, including data indicating the firmware utilized by devices (e.g., printer 104, MFP 105, etc.) that are managed by the device management apparatus 101. In other words, the firmware management module 101a may, at periodic intervals (e.g., set by an administrator) or at scheduled times (e.g., specified by an administrator), communicate with the device database 102 to obtain, from information regarding firmware (including version of the firmware) for each of the managed devices. Such firmware information may also additionally include the specifications of the firmware, the date the current version firmware was downloaded into the device, identification [e.g., URL (uniform resource locator) of server, etc.] of the source from where the firmware can be obtained or from where the current version of firmware was last downloaded from, etc. After obtaining the firmware information, the firmware module 101a may check, from time to time, with the firmware source, whether there is a new version of the firmware. For example, a manufacturer may decide to update the current firmware with a new version to fix issues or problems that exist in the current firmware and/or to provide additional device functionalities. In another example, in the case that the firmware management module 101a cannot find firmware information at the source or the source does not exist, the firmware management module 101a may perform a search (e.g., via search engine) throughout the network (e.g., internet).

After determining the firmware source, the firmware management module 101a may communicate with the firmware source to determine whether there is a newer version of the current firmware by, for example, comparing the version of the firmware offered by the source and the version of the firmware obtained from the device database 102. In the case that both the versions of the firmware are identical, the firmware management module 101a determines that it is not necessary to download the firmware offered by the source.

On the other hand, in the case that the version of the firmware offered by the source is newer, the firmware management module 101a downloads the newer version of the firmware along with corresponding release notes. Such release notes may be details that note the changes made to the previous version of the firmware, which are found in the newer version of the firmware. In addition, the firmware management module 101a may also obtain other information about the newer version such as the date of release, the device models compatible with the newer version, the type (e.g., enhancement, critical, security, etc.) of update the newer version is, etc.

After downloading the newest version of the firmware (including the corresponding release notes), the firmware management module 101a registers and registers the newer version along with the release notes into a firmware repository portion of the device database 102. Subsequently, the firmware management module 101a sends an electronic communication (e.g., e-mail, texting, SMS messaging, etc.) to a user (e.g., device administrator) to inform him or her that a newer version of a firmware has been downloaded into the firmware repository of the device database 102. In addition, the electronic communication may also have the release notes attached thereto (i.e. as an attachment) and a link to a scheduling page from which the user may schedule an action to install the newer version of the firmware on to the corresponding managed device (or devices).

The device database 102 may be directly connected (or within) the device management apparatus 101 and may have a firmware repository portion in which the device database 102 stores current versions of firmware (including corresponding information) that are presently installed on devices managed by the device management apparatus 102 and newer versions of firmware which are not yet installed on the managed devices. The firmware management module 101a may communicate firmware information and may receive newer versions of firmware including corresponding information (e.g., release notes, release date, type of update, etc.), which are to be stored in the repository. It should be appreciated that the firmware repository need not actually be part of the device database and that the device database may instead register URLs (uniform resource locators) to the firmware registered by the repository.

The terminal apparatus 103 can be any computing device, including but not limited to a workstation, desktop or notebook computer, a mobile information terminal (e.g., a tablet computer), etc., that can communicate with other devices through the network 106.

The terminal apparatus 103 permits a user (e.g., administrator) to communicate with the device management apparatus 101 to obtain current status information of devices (e.g., printer 104, MFP 105, etc.) that are currently managed by the device management apparatus 101. For example, the terminal apparatus 103 may have a web browser (e.g., Internet Explorer, Google Chrome, Mozilla Firefox, etc.) which may permit a user to access the device management apparatus via a uniform resource locator (URL). In another example, a device management client may be installed on, or downloaded to, the terminal apparatus 103 as an application. Thus, the terminal apparatus 103 may provide user interface views (e.g., pages, panels, etc.) showing data or information from the device management apparatus 101.

In addition, the user of the terminal apparatus 103 may view and manage the current version of firmware that is presently installed for each of the managed devices. Such management may also be assisted by the device management apparatus 101 in that whenever newer versions of firmware are released, the device management apparatus 101 may send electronic notifications to the user regarding the release of the newer versions of firmware. Such electronic notifications may in the form of e-mails which can be opened by the user on the terminal apparatus 101. Further, the user may also schedule tasks for installing the newer version of firmware via the terminal apparatus 101 by accessing the device management apparatus 101 via the web browser or the corresponding application.

The terms "printer" and "printer device" are used hereinafter generically to include any output device having a printing or plotting functionality, and include multifunction devices having a copy and/or scanning functionality in addition to the printing or plotting functionality.

Figure 4:
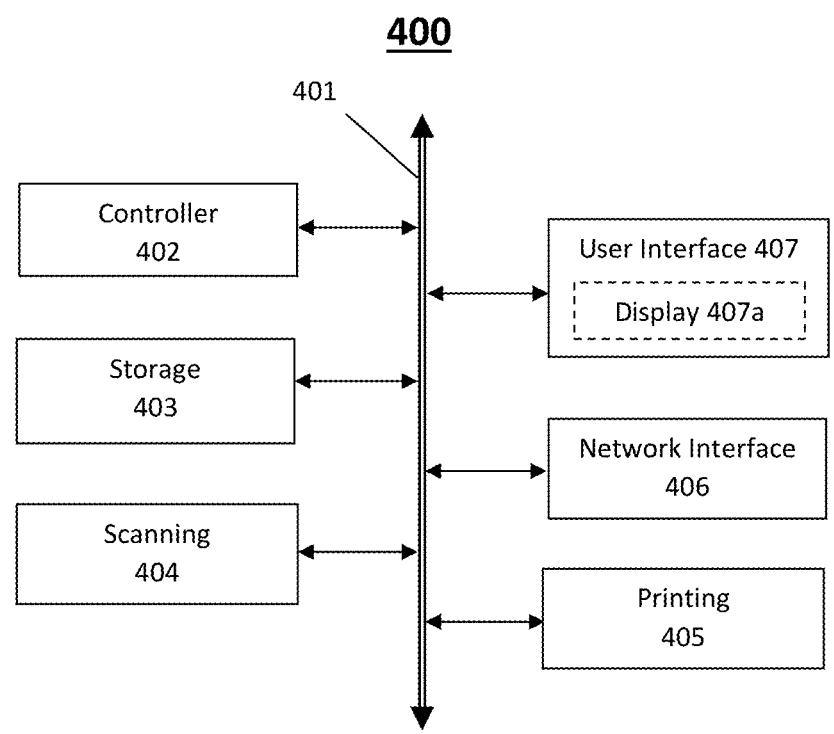
FIG. 4 shows a block diagram of an exemplary configuration of a multi-function device.

The MFP 105 can be, for example a printer/scanner, printer/scanner/fax, etc. While this example of this disclosure simply refers to a single MFP 105 and a single printer 104 in the interest of brevity, it should be appreciated that the network environment can have an arbitrary number of printer and MFP devices. The MFP 105 may be configured as shown in FIG. 4, which is discussed infra.

The network 106 can be a local area network, a wide area network or any type of network such as an intranet, an extranet (for example, to provide controlled access to external users, for example through the Internet), a private or public cloud network, the Internet, etc., or a combination thereof. In addition, communication over the network 106 may employ standard protocols, e.g., TCP/IP (Transmission Control Protocol/Internet Protocol), UDP (User Datagram Protocol), SNMP (Simple Network Management Protocol), HTTP (Hypertext Transfer Protocol), etc. How devices can connect to and communicate over networks is well known in the art and is discussed for example, in "How Networks Work", by Frank J. Derfler, Jr. and Les Freed (Que Corporation 2000) and "How Computers Work", by Ron White, (Que Corporation 1999). Such details are omitted in this disclosure, in order to avoid obscuring the inventive aspects of this disclosure.

Figure 1B:
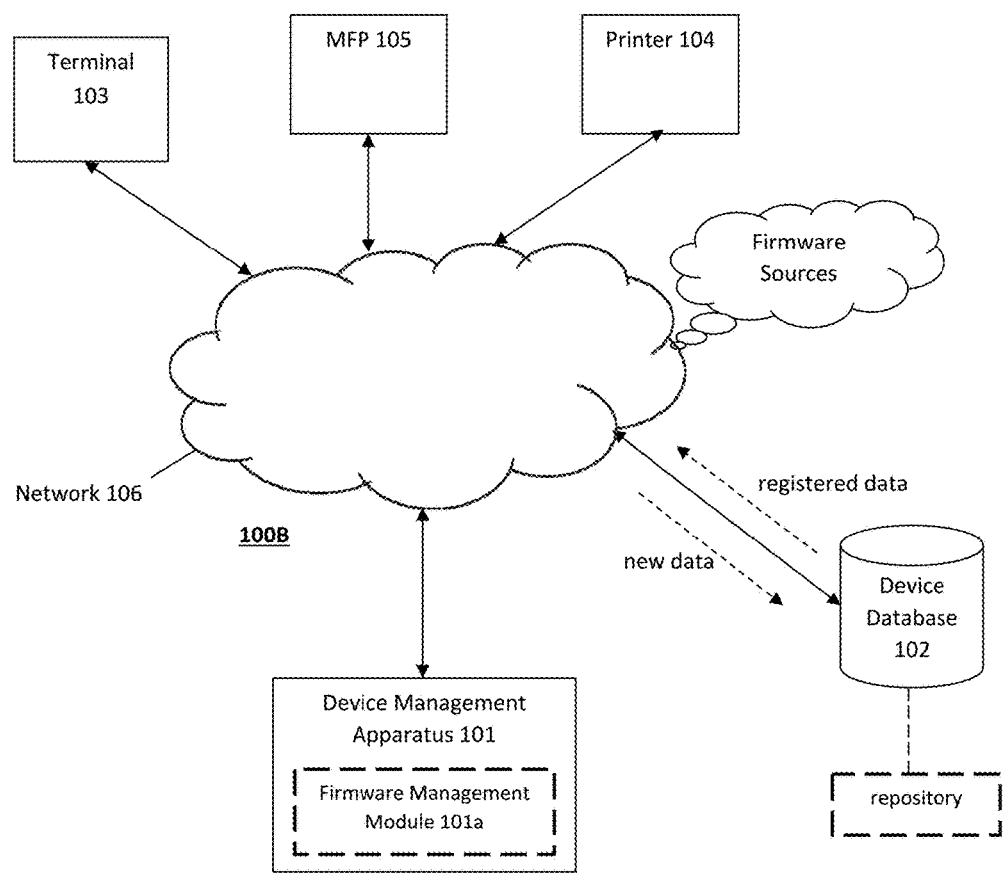
FIG. 1B shows a block diagram of a system in which a device management apparatus performs various tasks, including scheduled firmware updates, according to another exemplary embodiment.

FIG. 1B shows schematically a system 100B, according to another exemplary embodiment. The system 100B is similar to the system 100A of FIG. 1A except that device database 102 is connected to the network 106 in the system shown in FIG. 1B. The device database may not necessarily be connected to the device management apparatus 101. Instead, the device database 102 may be directly connected to the network 106. As a result, when the device management apparatus 101 stores downloaded firmware into the repository of the device database 102, the device management apparatus 101 facilitates registration of the firmware via the network 106.

Figure 2:
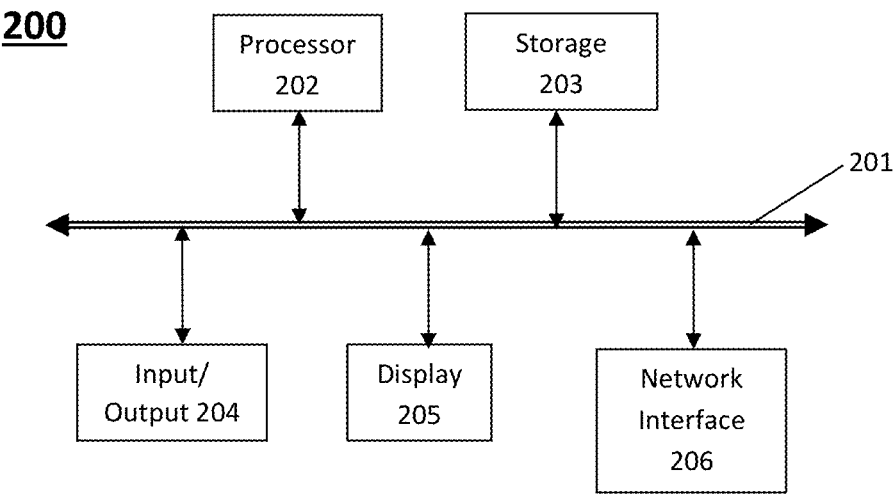
FIG. 2 shows a block diagram of an exemplary configuration of a computing device, that can be configured by programming to operate as the device management apparatus in the system shown in FIG. 1A or in the system shown in FIG. 1B.

Otherwise, operations of the elements of the system 100B are similar to those discussed in connection with the corresponding elements of the system 100A of FIG. 1A FIG. 2 shows an exemplary constitution of a computing device that can be configured (for example, through software) to operate (at least in part) as the device management apparatus 101 of FIGS. 1A and 1B. As shown in FIG. 2, apparatus 200 includes a processor (or central processing unit) 201 that communicates with a number of other components, including memory or storage part 203, network interface 206, display 205 and other input/output (e.g., keyboard, mouse, etc.) 204, by way of a system bus 201. The apparatus 200 may be a special-purpose device (such as including one or more application specific integrated circuits or an appropriate network of conventional component circuits) or it may be software-configured on a conventional personal computer or computer workstation with sufficient memory, processing and communication capabilities to operate as a device management apparatus, as will be appreciated to those skilled in the relevant arts.

In the management apparatus 200, the processor 202, memory/storage 203, network interface 206, display 205 and input/output 204 are conventional, and therefore in order to avoid obfuscating the inventive aspects of this disclosure, such conventional aspects will not be discussed in detail herein.

The management apparatus 200 includes the network interface 206 for communications through a network, such as communications through the network 106. However, it should be appreciated that the subject matter of this disclosure is not limited to such configuration. For example, the apparatus 200 may communicate with client terminals through direct connections and/or through a network to which some components are not connected. As another example, the apparatus 200 does not need to be provided by a server that services terminals, but rather may communicate with the terminals and devices on a peer basis, or in another fashion.

The apparatus 200 of the present disclosure is not limited to a server or computer, but can be manifested in any of various devices that can be configured to communicate over a network and/or the Internet.

Figure 3:
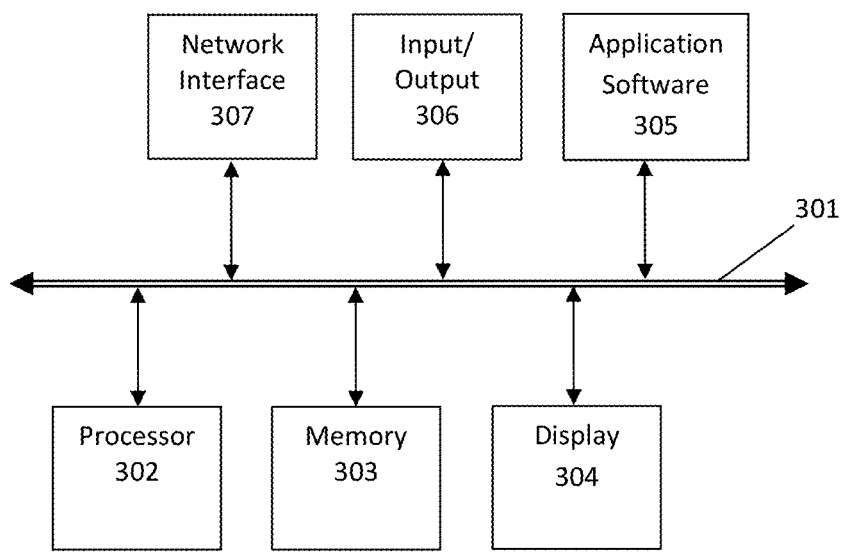
FIG. 3 shows a block diagram of an exemplary configuration of a terminal that can operate as the terminal 103 in the system shown in FIG. 1A or in the system shown in FIG. 1B.

An exemplary constitution of the terminal apparatus 103 of FIGS. 1A and 1B (for example, as a computer) is shown schematically in FIG. 3. In FIG. 3, computer 300 includes a processor (or central processing unit) 302 that communicates with a number of other components, including memory 303, display 304, application software 305, input/output (such as keyboard, mouse, touchpad, stylus, microphone and/or speaker with voice/speech interface and/or recognition software, etc.) 306 and network interface 307, by way of an internal bus 301.

The memory 303 can provide storage for program and data, and may include a combination of assorted conventional storage devices such as buffers, registers and memories [for example, read-only memory (ROM), programmable ROM (PROM), erasable PROM (EPROM), electrically erasable PROM (EEPROM), static random access memory (SRAM), dynamic random access memory (DRAM), non-volatile random access memory (NOVRAM), etc.].

The network interface 307 permits the apparatus 300 to establish a connection (for example, by way of an Ethernet connection or other network connection which supports any desired network protocol such as, but not limited to TCP/IP, IPX, IPX/SPX, NetBEUI, etc.) to the network to which the computer 300 is connected (e.g., network 106 of FIGS. 1A and 1B).

Additional aspects or components of the computer 300 are conventional (unless otherwise discussed herein), and in the interest of clarity and brevity are not discussed in detail herein. Such aspects and components are discussed, for example, in "How Computers Work", by Ron White (Que Corporation 1999), and "How Networks Work", by Frank J. Derfler, Jr. and Les Freed (Que Corporation 2000), the entire contents of each of which are incorporated herein by reference.

FIG. 4 shows a schematic diagram of a configuration of a printing device as an MFP (multi-function printer or multi-function peripheral), which can be any apparatus (including a microprocessor chip or a collection of devices having varying degree of integration) that has the ability to perform two or more functionalities. The MFP 400 shown in FIG. 4 includes a controller 402, and various elements connected to the controller 402 by an internal bus 401. The controller 402 controls and monitors operations of the MFP 400. The elements connected to the controller 402 include storage 403 (for example, random access memory, read-only memory, hard disk drive, portable storage media drive such as for optical discs, magnetic discs, magneto optical discs, etc., semiconductor memory cards, combinations of storage media, etc.), scanning provisions 404, printing provisions 405, a network interface (I/F) 406 and a user interface 407.

Storage 403 can include one or more storage parts or devices [e.g., a read only memory (for example, ROM, PROM, EPROM, EEPROM, etc.), a random access memory (RAM), a hard disk drive (HDD), portable media (for example, floppy disk, optical disc, magnetic discs, magneto-optical discs, semiconductor memory cards, etc.) drives], and program code instructions can be stored in one or more parts or devices of storage 403 and executed by the controller 402 to carry out the instructions. Such instructions can include instructions for performing specified functions (such as printing, scanning, faxing, copying, e-mailing, etc.) of the MFP 400, to enable the MFP 400 to interact with a terminal, as well as perhaps other external devices, through the network interface 406, and interactions with users through the user interface 407.

The network interface 406 is utilized by the MFP 400 to communicate with other network-connected devices such as a terminal, a server and receive data requests, print jobs, user interfaces, and etc.

The user interface 407 includes one or more electronic visual displays that display, under control of controller 402, information allowing the user of the MFP 400 to interact with the MFP 400. The electronic visual display can be any of various conventional displays (such as a liquid crystal display, a plasma display device, a cathode ray tube display, etc.), but preferably is equipped with a touch sensitive display (for example, liquid crystal display) and is configured to provide a GUI (graphical user interface) based on information input by an operator of the MFP 400, so as to allow the operator to interact conveniently with services provided on the MFP 400, or with the MFP 400 serving as terminal for accessing electronic data or other content through the network. User interfaces or other contents received through the network via the network interface 406 can be displayed on the display screen.

The display screen does not need to be integral with, or embedded in, a housing of the MFD 400, but may simply be coupled to the MFD 400 by either a wire or a wireless connection. The user I/O 407 may include keys and/or buttons (such as graphical keys or buttons, or other graphical elements, of a GUI on a touchscreen display 407a) for inputting information or requesting various operations. Alternatively, the user I/O 407 and the display screen may be operated by a keyboard, a mouse, a remote control, voice recognition, or eye-movement tracking, or a combination thereof.

Since the MFD 400 is typically shared by a number of users, and is typically stationed in a common area, the MFD 400 preferably prompts the user to supply login credentials or authentication information, such as user name (or other user or group information), password, access code, etc. The user credentials may also be stored for the session and automatically supplied if access to other devices through the network requires it. On the other hand, such other devices may prompt the user to supply other user credentials through the user interface.

Other methods of authentication may also be used. For example, the MFD 400 may be equipped with a card reader or one or more biometrics means (such as comparing fingerprints, palm prints, voice or speech, retinas or irises, facial expressions or features, signature, etc.). The MFD 400 may communicate the user credentials, provided in the manners discussed above, to other devices or applications connected to the MFD 400 via a network (e.g., the network 106 of FIG. 1A and FIG. 1B) for determining authorization for performing jobs.

Scanning provisions 404, printing provisions 405, and network interface 406 are otherwise conventional, and therefore, a detailed description of such conventional aspects is omitted in the interest of clarity and brevity. The MFP 400 can have any or all of the functions of similar devices conventionally known, such as for scanning, editing and storing images, sending a fax, sending and receiving e-mails with or without attachments, accessing files by FTP or another protocol or facility, surfing the Web, scan-to-folder, scan-to-email, etc. Further, multi-functional devices or multi-function peripheral devices can play a prominent role to convert hardcopy documents to electronic documents.

Figure 5:
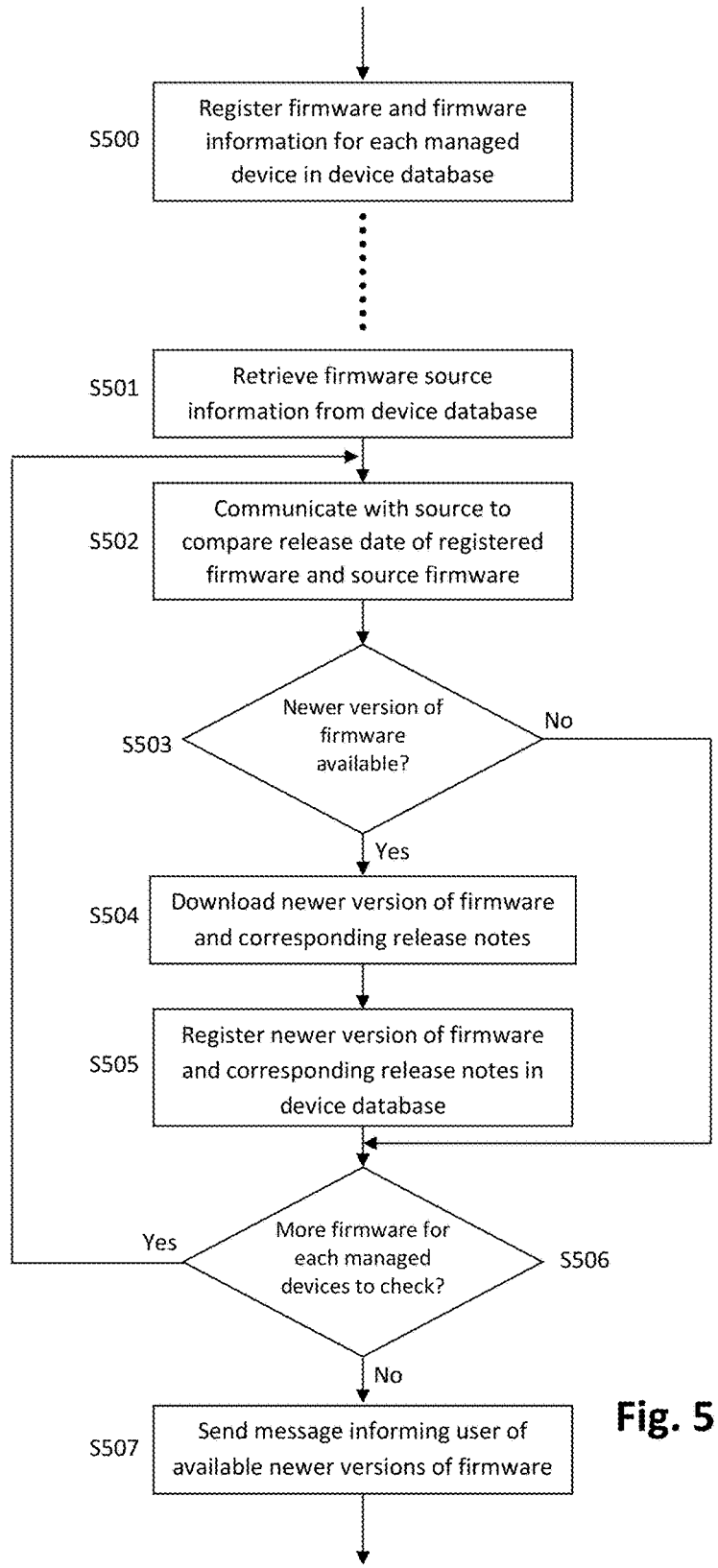
FIG. 5 shows a flow chart of a method performed in the system shown in FIG. 1A or in the system shown in FIG. 1B.

FIG. 5 show a method performed by a device management apparatus (e.g., 101 in FIGS. 1A and 1B), according to an exemplary embodiment.

In an exemplary scenario, an enterprise (e.g., a company, etc.) may have a network of devices (e.g., printer 103, MFP 104, etc.). However, the number of such devices may be large and thus difficult or at least burdensome for an administrator (e.g., "Andrew Normale") to monitor and manage every device. In the case of manually managing each of the devices, the administrator may need to update certain software (e.g., device driver, firmware, operating system, programs, etc.), troubleshoot problems (e.g., out of toner, paper jam, broken roller, etc.), keep a record of devices (e.g., device identifier, location, MAC/IP Address, model no., manufacturer, etc.), etc. Since such managing may be time consuming, the enterprise may also possess one or more device management apparatuses (e.g., device management apparatus 101 of FIGS. 1A and 1B) to assist the administrator in managing the devices. The device management apparatus may communicate via a network (e.g., network 106 of FIGS. 1A and 1B) to manage the devices connected to the network. Further, the device management apparatus may be configured to assist in managing and updating firmware for each device connected to the network.

For example, a new version of firmware for one or more devices (manufactured by XYZ Corp.) amongst the managed fleet may be available. Such new version of firmware fixes defects (e.g., bugs) present in the current installed firmware. Thus, it may that the new version is considered to be a critical update. Consequently, it would be crucial to have the new firmware version be promptly downloaded and installed on the aforementioned devices. On the other hand, if the enterprise employs a conventional management process, the administrator, who manages many different models and types of devices and does not receive firmware update notifications from device manufacturers, may not be aware of the newer version of firmware for devices manufactured by XYZ Corp. and therefore, may not take any necessary actions to update the old firmware for the devices manufactured by XYZ Corp.

On the other hand, a device management apparatus may be provided and configured to monitor periodically for newer versions of firmware for all managed devices and, in the case that the device management apparatus discovers a newer version of firmware, the device management apparatus informs the administrator of the newer version of firmware. The device management apparatus may be configured to register, into a repository of a device database (e.g., device database 102 of FIGS. 1A and 1B), firmware and corresponding firmware information (e.g., version, release notes, etc.) for each device managed by the device management apparatus (step S500). Then, at periodic intervals (e.g., set by a user or an administrator), the device management apparatus communicates with the repository of the device database to retrieve firmware information for each of the managed devices and extracts the source (e.g., website, server, etc.) of the firmware from the firmware information (step S501). In other words, the device management apparatus obtains the firmware source for each of the managed devices. Afterwards, the device management apparatus communicates with a particular firmware source to determine if there is a newer version of firmware available by, for example, comparing the release date of the registered firmware and the release date of the firmware at the source (step S502). In the case that there is a newer version of firmware available (step S503, yes), the device management apparatus downloads the newer version of firmware from the firmware source along with the release notes (step S504).

The release notes are documents that may accompany software (e.g., firmware) to explain to the end user information regarding the software. For example, if the software is being used for the first time by a user, the release notes may contain information on important details about the software such as installation notes, code documentation, etc. On the other hand, release notes may also accompany upgrades to software already being in use by the end user. For example, it may be that a firmware version "1.1" has a security flaw that was not discovered until six months after the release date. Thus, the manufacturer responsible for firmware version "1.1" may create an upgrade called "1.2" to fix the security flaw. The release notes accompanying firmware version "1.2" may contain information regarding the purpose of the update, the nature of the security flaw encountered in firmware version "1.1", the method used to fix the security flaw, the code used for the fix, and any changes that may be needed by the end user. In other words, the release notes may assist an end user of the firmware in determining why the newer version of the firmware exists and how the changes made in the newer version can affect the end user.

After downloading the newer version of firmware from the particular source, the device management apparatus registers the newer version of firmware along with the corresponding release notes into the device database (step S505). In the case that the device management apparatus has checked the firmware source but has determined that there is not any newer version of firmware (step S503, no) or in the case that the device management apparatus has completed downloading the newer version of firmware (along with corresponding release notes), the device management apparatus determines whether there are any more firmware sources to check (step S506). If there are more firmware sources to check (step S506, yes), the device management apparatus repeats S502-S505 for the next firmware source. Otherwise (step 506, no), the device management apparatus sends an electronic message (e.g., e-mail, SMS, etc.) notifying the user (e.g., administrator) that new versions of firmware are available to be installed into corresponding devices (step S507).

Figure 6A:
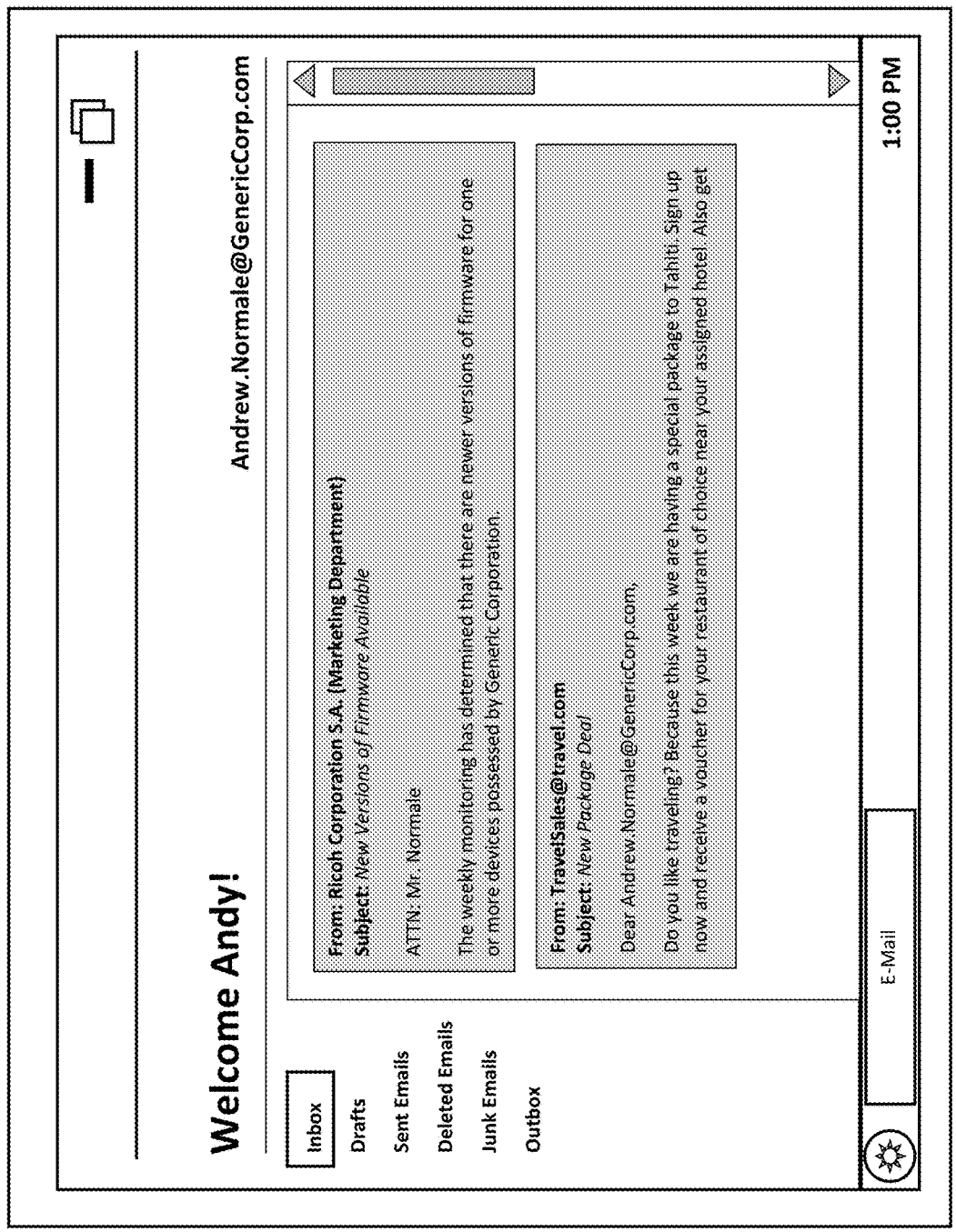
FIGS. 6A-6C show respective examples of user interface views provided on a terminal apparatus, according to an exemplary embodiment, or on the device management apparatus in the system shown in FIG. 1A or in the system shown in FIG. 1B.
Figure 6B:
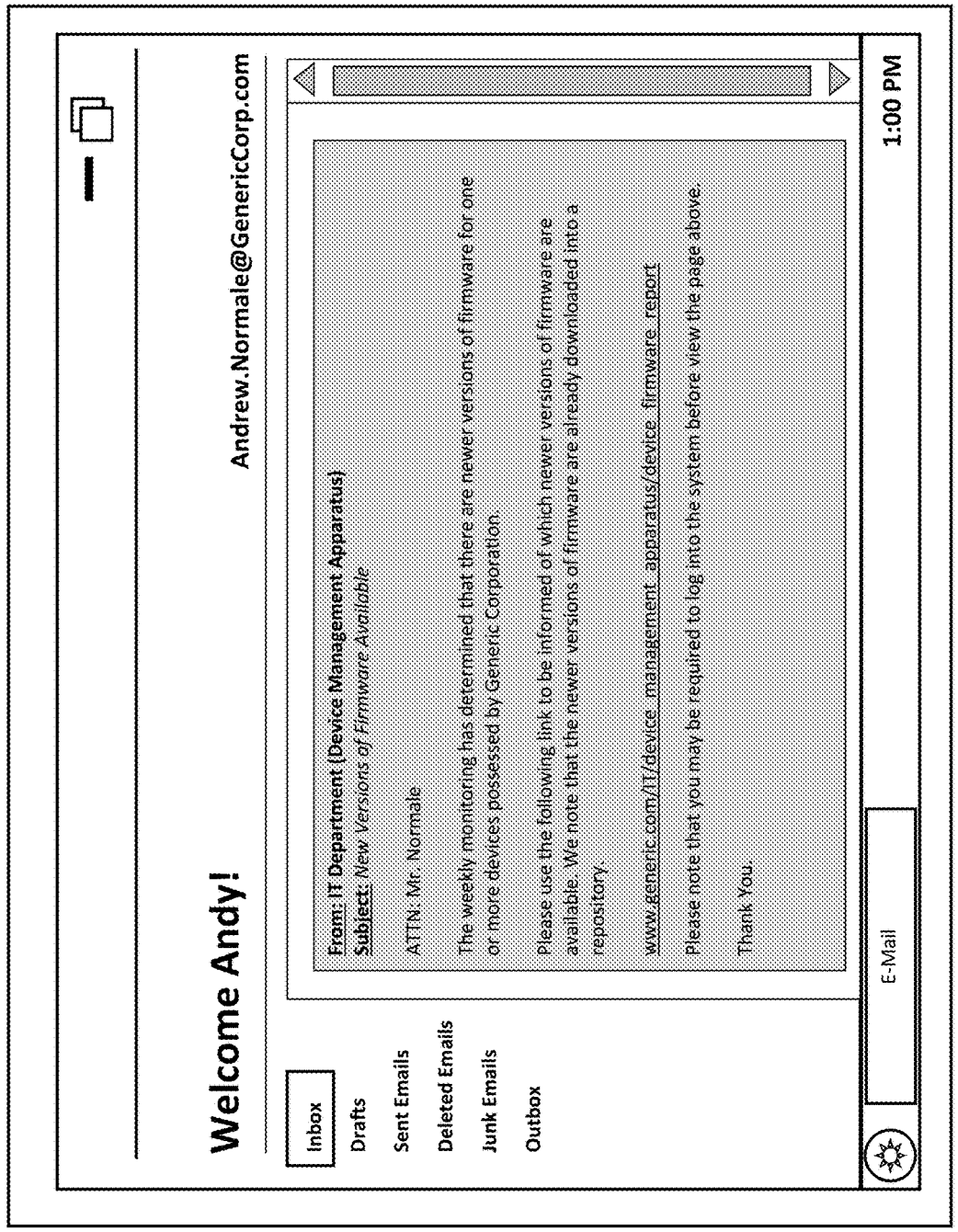
Figure 6C:
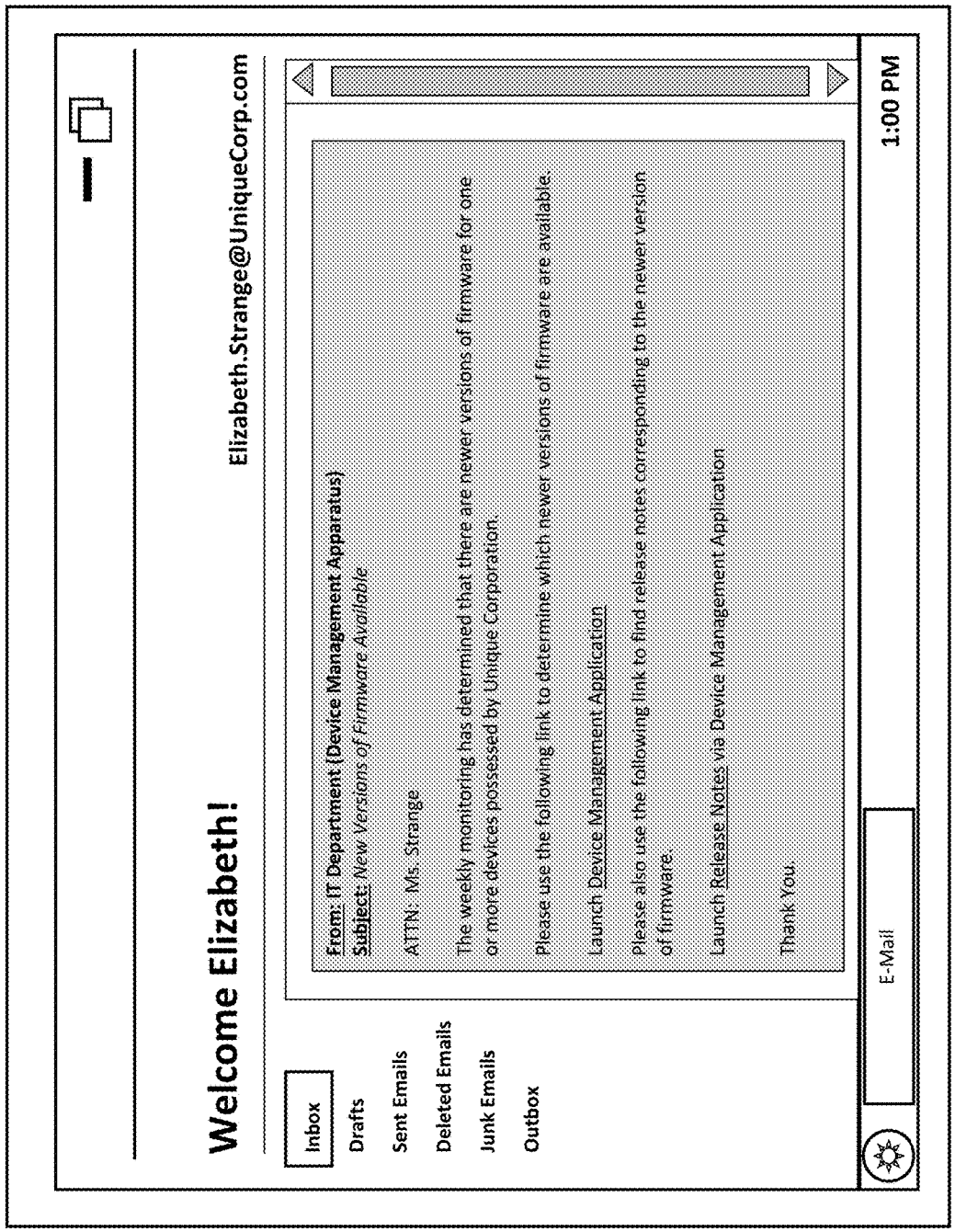

An example of such electronic message is shown as an e-mail in FIG. 6A. In this case, the user "Andrew Normale" may have received an electronic message from the device management apparatus that there are new versions of firmware for at least one of the devices managed by the device management apparatus. More specifically, the email, such as shown in FIG. 6B, provides a link to a URL which leads to a webpage from which the user "Andrew Normale" may be informed of which devices have new firmware updates for. In another example, the email may be customized for each user, such as shown in FIG. 6C. In this case, the user "Elizabeth Strange" may be an employee of "Unique Corporation" which utilizes the application (e.g., program) version of the device management apparatus. Thus, "Elizabeth's" e-mail provides a link to activate such device management application. Further, in an exemplary embodiment, the e-mail may also contain a link to all of the release notes corresponding to the newer versions of firmware.

Figure 7:
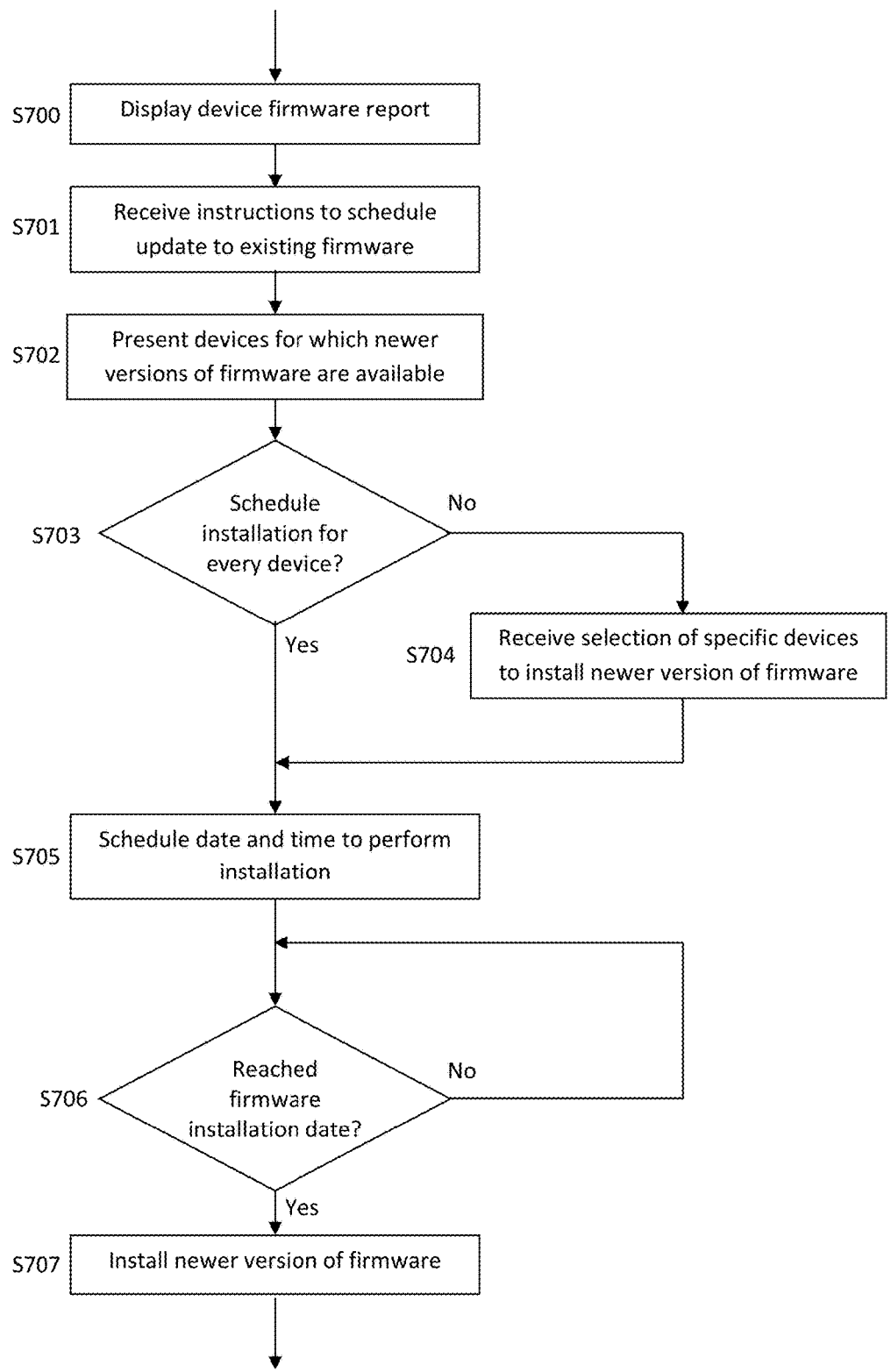
FIG. 7 shows a flow chart of a method performed in the system shown in FIG. 1A or in the system shown in FIG. 1B.

FIG. 7 shows a method performed by a device management apparatus (e.g., 101), according to an exemplary embodiment.

After the user of the terminal apparatus (e.g., terminal apparatus 103) receives the electronic message sent by the device management apparatus notifying him or her that one or more manufacturers have released a newer version of firmware for one or more of the devices managed by the device management apparatus, the user may select to install one or more of the newer version of firmware by activating a link (e.g., URL) contained in the same electronic message sent by the device management apparatus. In an example, the user may activate a URL link causing the terminal apparatus to open a web browser to display a web page corresponding to the URL link. In another example, the user may activate a link to an application (e.g., program) for accessing and performing actions on the device management apparatus.

Figure 8A:
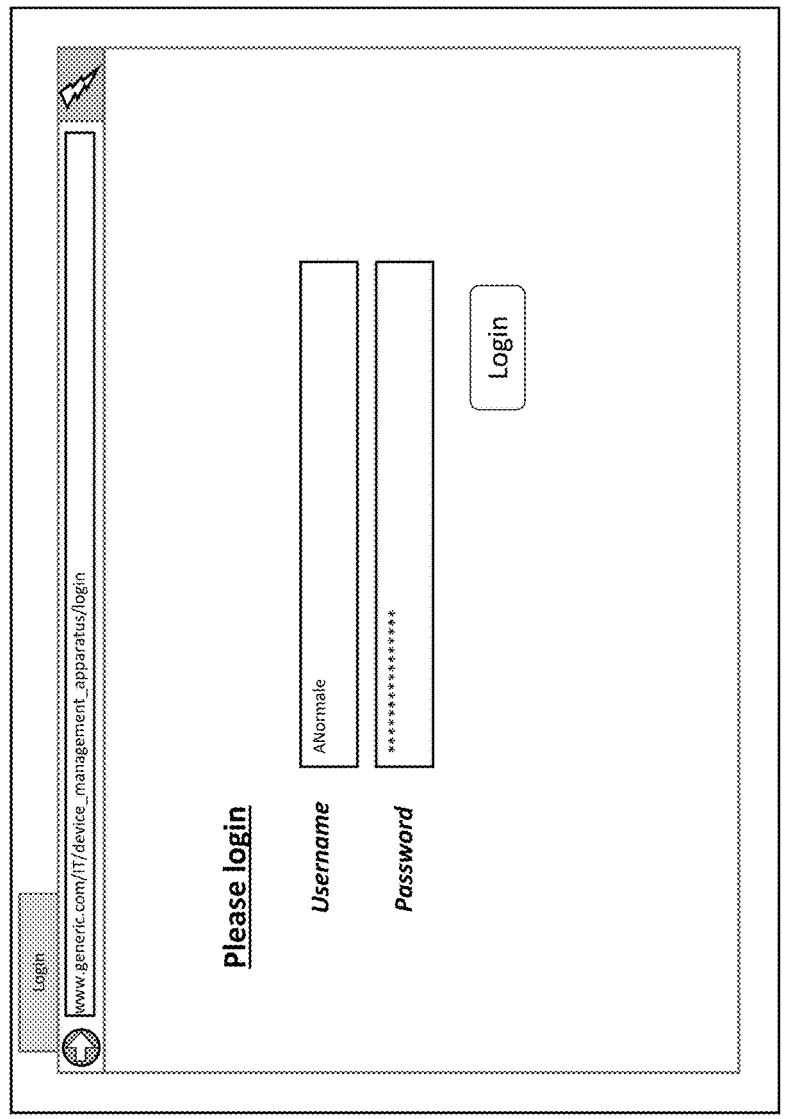

In either case, the user is presented a user interface screen to log in for accessing the device management apparatus, such as shown in FIG. 8A. Next, the device management apparatus authenticates user credentials inputted by the user. Subsequently, the device management apparatus provides the user with a report detailing the information (e.g., device display name, manufacturer name, model no., network MAC address, etc.) of each device for which a newer version of firmware has been released by the corresponding manufacturer (step S700), such as shown in FIG. 8B. In an exemplary embodiment, the user interface screen shown in FIG. 8B may be accessible by the user anytime, even without the link from the e-mail. Further, the device management apparatus may also include information on the current firmware (e.g., version, release date) that is currently installed on the device, information (e.g., release notes) on the newer version of firmware that is available, and the firmware update type (e.g., enhancement, security, critical, etc.). It should be noted that the release date, for example, may be the date that the firmware was first released by the manufacturer. In this case, the user may be shown the release date for both the current version of firmware presently on the device and the release date of the newer version of firmware.

As discussed previously, the release notes are documents that are written by the manufacturers to provide information to the user as to (i) why there exists a newer version of firmware, (ii) details on the changes made to the current version of firmware that are present in the newer version of firmware, and (iii) actions that may be required by the user in view of the changes made, etc. The user may access security notes for each of the managed devices that have newer versions of firmware released by the corresponding manufacturer by activating the "Yes" button which displays release notes corresponding to the firmware. Of course, it should be noted that not every manufacturer has release notes for their firmware as shown by the "No" label.

The firmware update type (e.g., enhancement, security, critical, etc.) may be set by a manufacturer who released the corresponding newer version of firmware. Thus, a user such as an administrator may be able to determine, in general, the characteristic of the newer version of firmware or, in other words, the reason for the firmware update.

For example, in an enhancement update, it may be that a previous version of a firmware "version 4.1", while without any issues, was not compatible with newer versions of widely used software that was recently released. In light of this issue, the manufacturer may decide to upgrade the firmware by making it compatible with the widely used software. In another example, the firmware "version 4.1" may have been coded using regular coding techniques at the time. However, a new coding algorithm may make certain parts of the software more efficient. As a result, the manufacturer may incorporate this new algorithm by releasing an update to the existing firmware (e.g., "version 4.2").

In another example, a critical update may address software bugs or defects that causes the device to malfunction when executing the firmware. In such instance, the new firmware version may address the aforementioned defect. Further, it may also be that the manufacturer may anticipate issues or problems in the near future. Thus, the manufacturer may offer a newer version of firmware to prevent such near future issue from occurring.

A security update may be released to address security flaws or issues that render the device susceptible to attacks by a malicious person (e.g., hacker) or code. Such security issues could be a "back-door" that could allow hackers to access the systems or may be vulnerabilities that permit the malicious person to shut down the entire system. Thus, after the manufacturer has discovered these security flaws, a newer version of firmware may be released by the manufacturer to fix such security flaws.

Figure 8D:
Figure 8E:
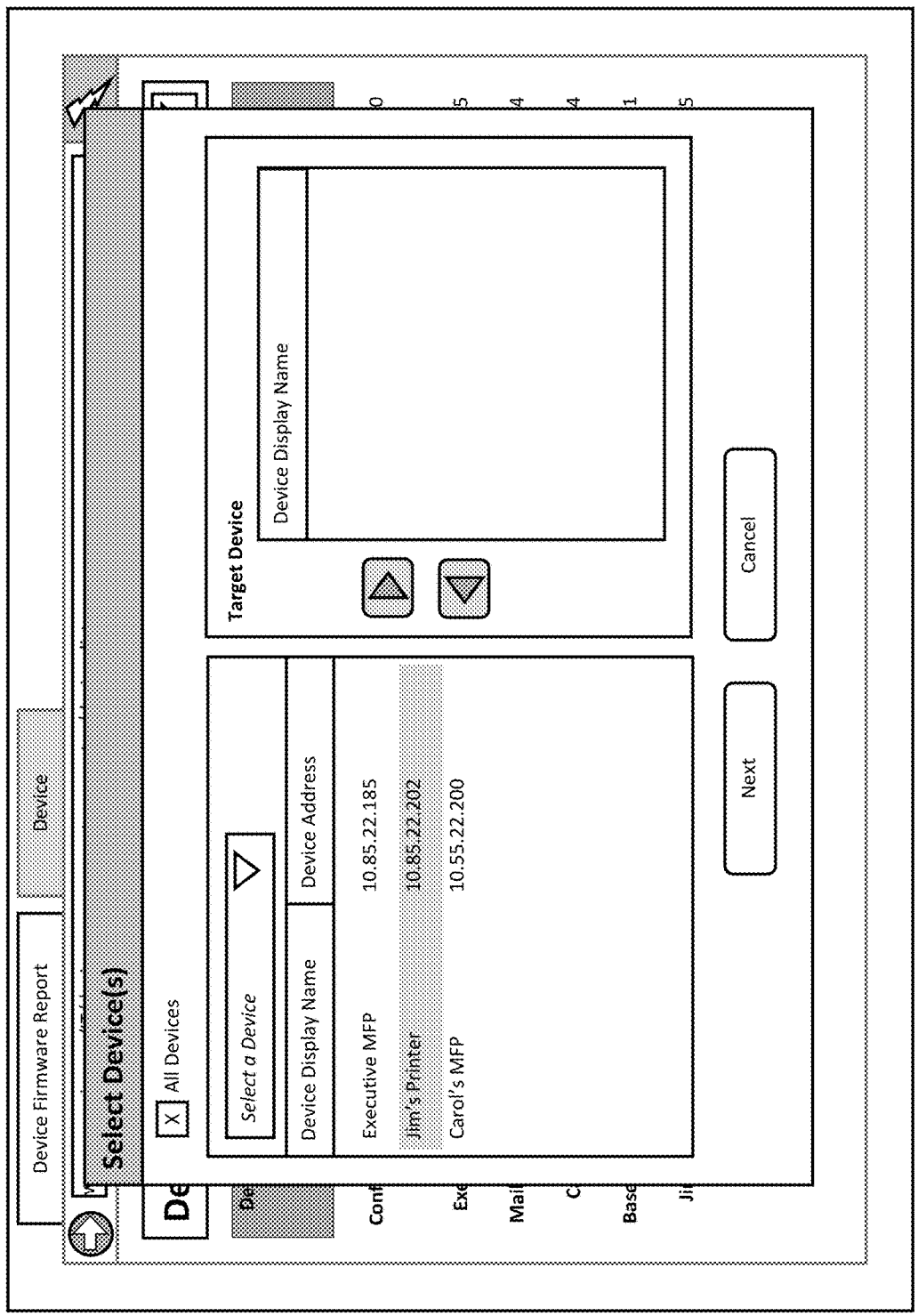

After the user has viewed the release notes, he or she may proceed to schedule the installation of the newer version of firmware by activating the "Schedule" button. When the device management apparatus receives the request to schedule installation of the newer versions of firmware (step S701), the device management apparatus may present the user with a screen that includes a table of all the devices that are currently managed by the device management apparatus, such as shown in FIG. 8C. By selecting one of the managed devices (e.g., "right clicking"), the user may be presented with a user interface screen for the user to perform a variety of tasks, such as shown in FIG. 8D. In this case, the device management apparatus, in response to a request from the user to perform a scheduling task for installing the newer versions of firmware at a specific date and time, displays a user interface which lists all of the devices, amongst the fleet managed by the device management apparatus, for which the corresponding manufacturer has released a new version of firmware (step S702), such as shown in FIG. 8E.

Next, the device management apparatus determines whether the user wishes to install every newer version of firmware (step S703). In other words, it is not necessary for the user to install all of the newer version of firmware at once. The user may select just a subset of the devices while leaving the remaining portion unselected. Such selective install may be desirable, if the newer version is to be installed on a large number of devices, in which instance there might be issues (e.g., unacceptably long down time) when installing all of the firmware update at once.

Figure 8F:
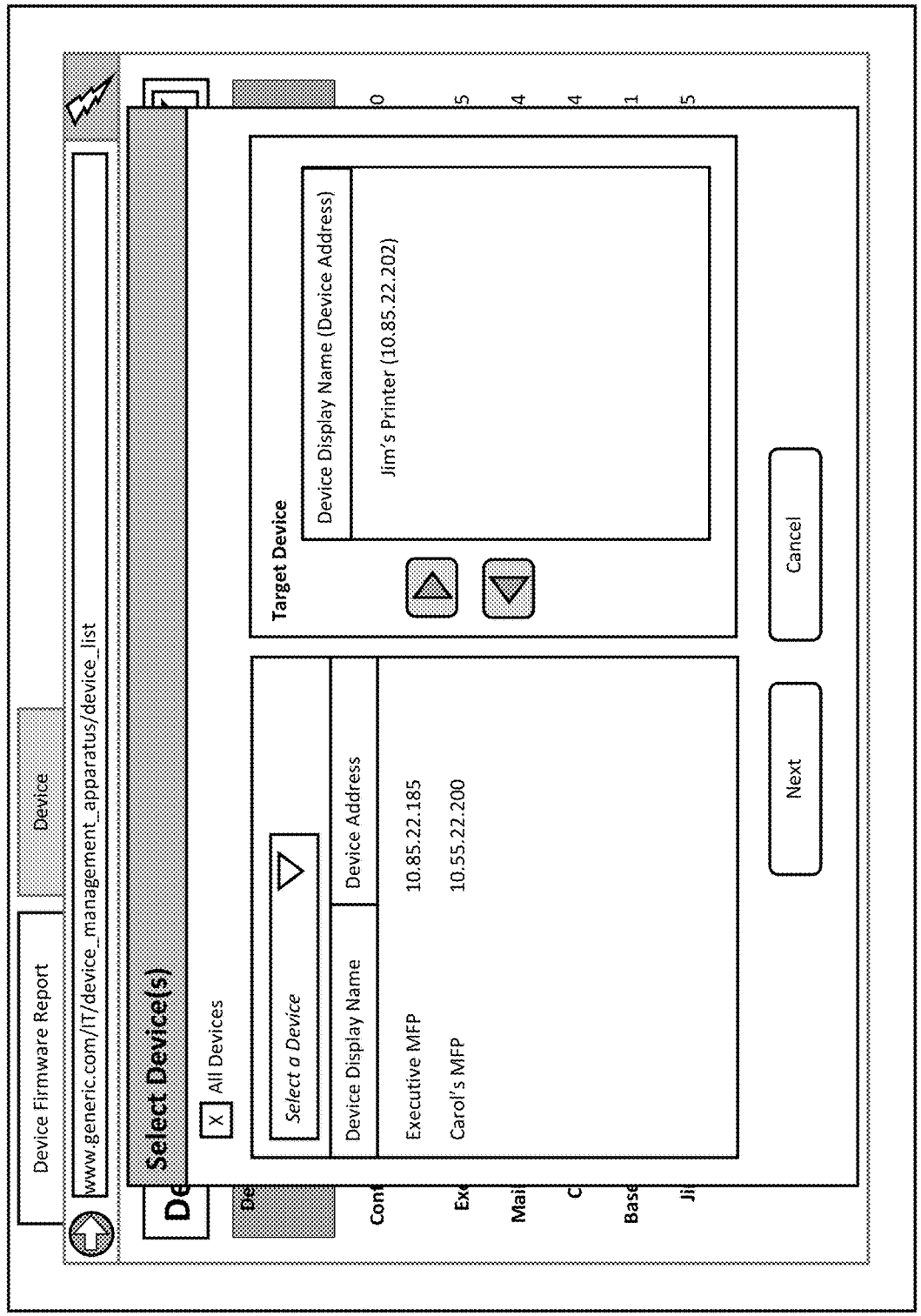

In the case that the device management apparatus determines that the "All Devices" box has been checked (step S703, yes), the apparatus proceed to execute the update on all of the devices. On the other hand, in the case that the user wants to select specific newer versions of firmware to be installed (step S703, no), the device management apparatus provides a user interface for the user to select particular devices to update, which are received by the device management apparatus (step S704). For example, to perform selection, the user may highlight the selected device and activate the arrow pointing to the right, such as shown in FIG. 8F. On the other hand, if the user makes a mistake by selecting the wrong devices, he or she may simply activate the arrow pointing to the left to undo such selection.

Figure 8G:
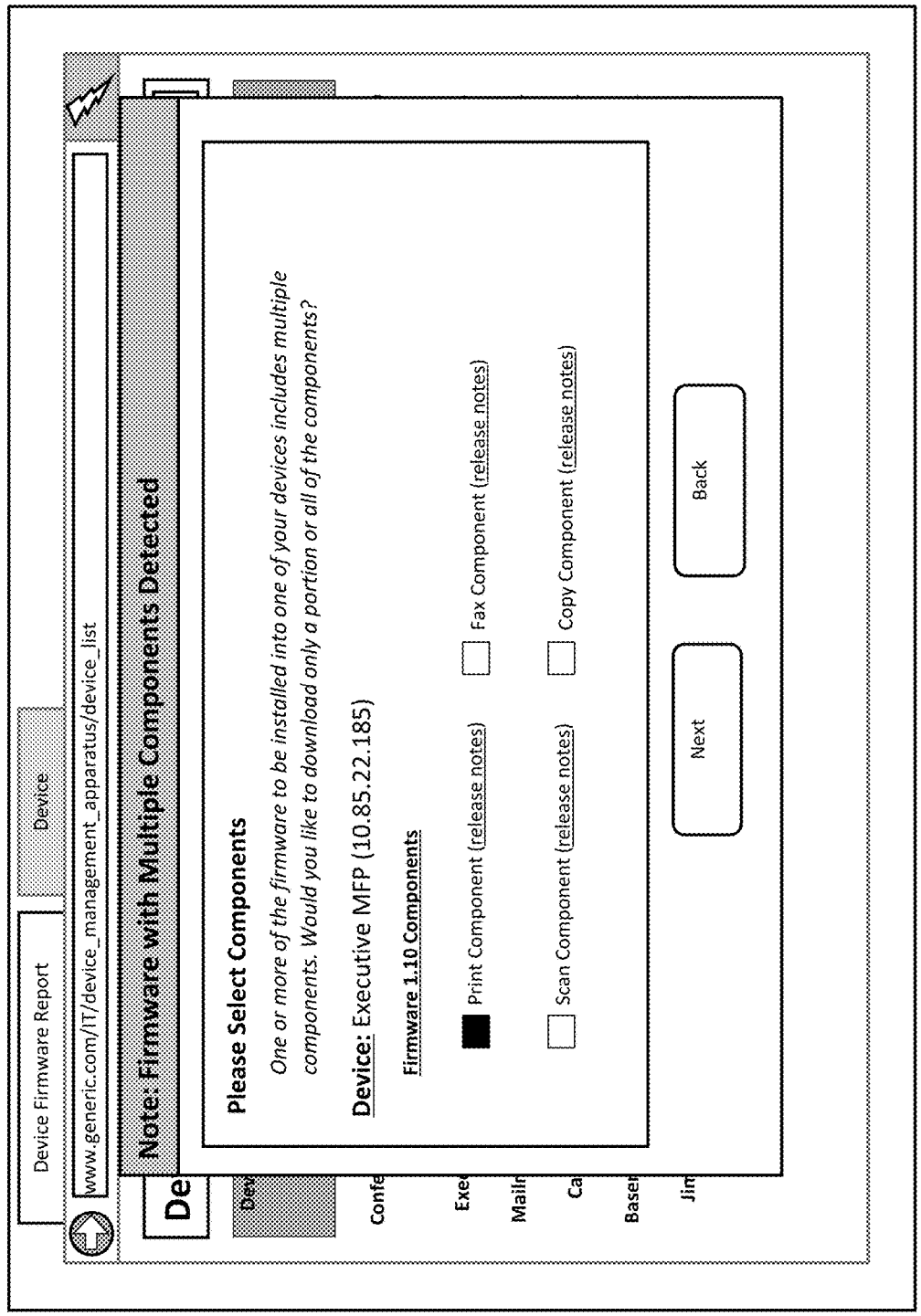

After the user has completed the selection of devices to have the newer version of firmware installed thereon by activating the "OK" button, the device management apparatus may determine that the newer firmware version for one or more of the selected devices includes multiple components (e.g., corresponding to different respective functions of the devices). In the example shown in FIG. 8G, the new firmware version ("version 1.10") of the device "Executive MFP" has four components (i.e. print, scan, copy, fax). In some instances, the user may optionally be allowed to choose to unselect some of the components of the firmware update, such as shown in FIG. 8G. On the other hand, there may be other instances in which the components are interdependent and it is desirable for all of the components to be installed, and in such instance the user would not be permitted to de-select any of the components.

Further, the user may be aided in his or her decision as to which component to be installed by being able to view the accompanying release notes. To do so the user may activate the corresponding "release notes" button. In one example, the release notes may be a single document. Thus, when the user selects the release notes for a certain component (e.g., printing), the device management apparatus displays the particular section corresponding to the selected component, thereby allowing the user to conveniently access the relevant section without having to search. In another example, the release notes may be constituted by a collection of multiple documents, and in such instance, when the user selects the release notes for a certain component (e.g., scan), the corresponding document is retrieved and displayed.

Figure 8H:
Figure 8I:
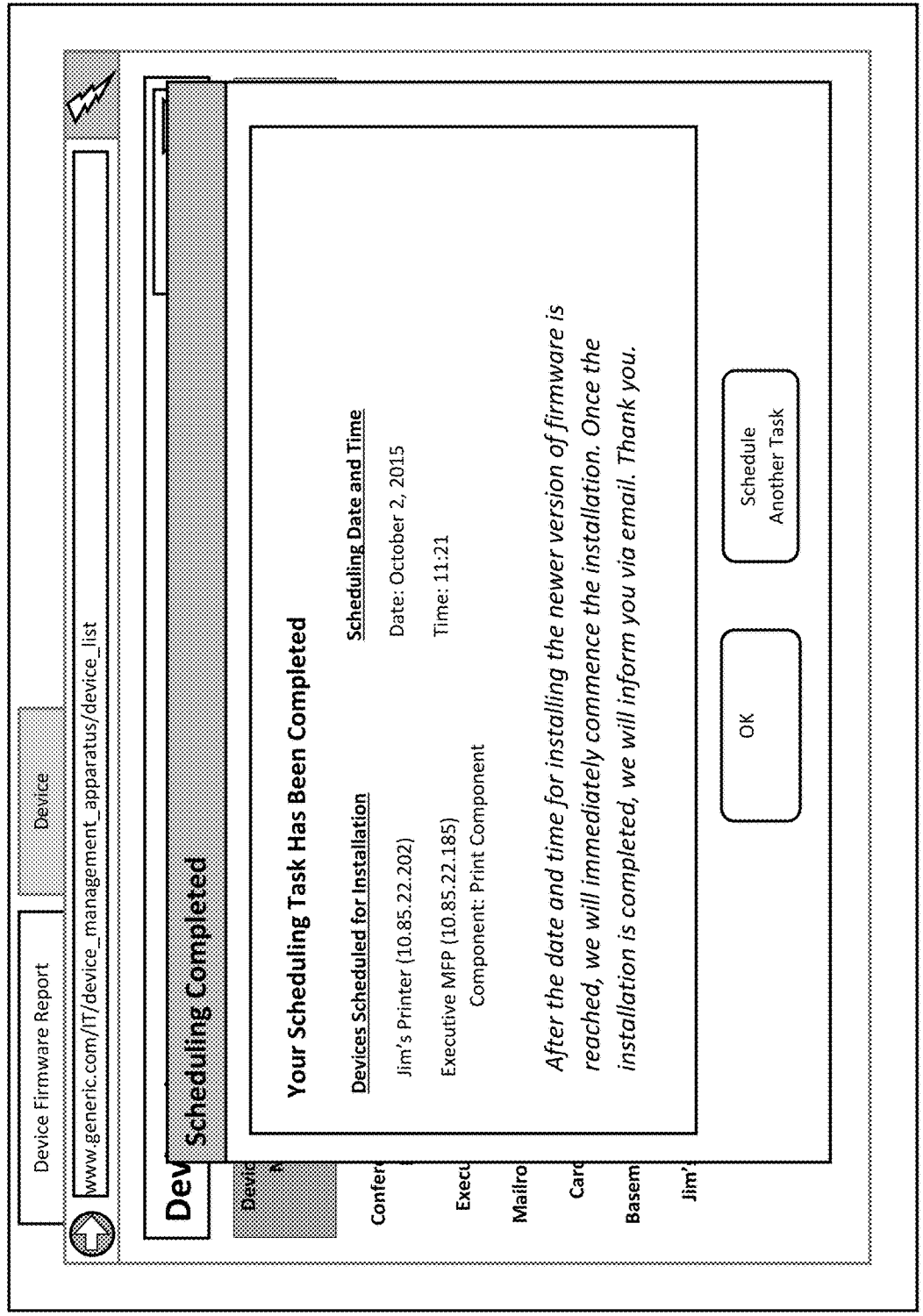

After the user selects the components, the device management apparatus presents a user interface part for the user to set the date and time of when to begin installation of the newer version of firmware, such as illustrated in FIG. 8H. As shown, the user may be able set the exact date (e.g., day, month, year, etc.) and the exact time (e.g., hour, minute, etc.) at which the newer version of firmware is to be installed onto the device (step S705). After the user has scheduled the date and time in which the newer versions of firmware is to be installed onto each of the corresponding devices, the device management may present the user with a screen, such as shown in FIG. 8I, which gives the user a summary of the action that is to be performed by the device management apparatus with regards to the installation of the newer versions of firmware. Further, the user may also be permitted to schedule another installation (at another date) task for devices (e.g., "Carol's MFP) which the user did not previously select to have the newer version of firmware installed.

After the user has scheduled the task for installation of the newer versions of firmware, the device management apparatus may monitor such time and date set by the user until it is reached (step S706). In the case that the date and time is reached (step S706, yes), the device management apparatus installs each of the newer version of firmware for the corresponding devices (step S707). Otherwise, (step S706, no), the device management apparatus waits until the specified date and time is reached before performing installation of the newer version of firmware.

In an exemplary embodiment, the user does not need to use a browser to access the device management apparatus. Instead, the user may utilize a device management application, such as shown in FIG. 8J, that may be installed on the user's terminal apparatus to perform all the steps of the aforementioned process.

The orders in which the steps are performed in the aforementioned methods are not limited to those shown in the examples of FIGS. 5 and 7, and may be switched as long as similar results are achieved. Also, it should be noted that the methods or processes illustrated in the examples of FIGS. 5 and 7 may be implemented using any of the systems described in connection with FIGS. 1A and 1B.

The aforementioned specific embodiments are illustrative, and many variations can be introduced on these embodiments without departing from the spirit of the disclosure or from the scope of the appended claims. For example, various aspects, features and advantages disclosed herein can by applied to automate firmware update, even when the device on which the firmware is installed does not have any print functionality.

In addition, elements and/or features of different examples and illustrative embodiments may be combined with each other and/or substituted for each other within the scope of this disclosure and appended claims.

What is claimed is:

1. A device management apparatus for managing a fleet of image forming devices, the device management apparatus comprising:
   a device database including a repository registering firmware downloaded for the fleet of image forming devices, the device database additionally registering firmware version information specifying, for each managed device amongst the fleet of image forming devices, the firmware and version thereof that is registered for the managed device; and
   a firmware management module that communicates with firmware sources through a network to determine whether newer versions of the firmware registered in the repository are available for download from the firmware sources,
   wherein when the firmware management module determines that a newer version of a specified registered firmware is available for download, the firmware management module downloads said newer version of the specified registered firmware and release notes corresponding to said newer version, registers the newer version and the corresponding release notes in the repository, sends by electronic communication to a device administrator a notification specifying that the newer version of the specified firmware has been downloaded to the repository and providing the corresponding release notes and a link to a scheduling page to schedule a task to install the newer version on, amongst the fleet of image forming devices, one or more managed devices that employ the specified firmware, and
   wherein when the newer version of the specified firmware includes a plurality of components, the scheduling page provided by the device management apparatus permits the administrator to select one or more components amongst the plurality of components while leaving one or more components amongst the plurality of components unselected and to create a firmware update package that includes the selected components to be deployed to selected devices amongst the managed devices that employ the specified firmware, without deploying any unselected components.

2. The device management apparatus as claimed in claim 1, wherein the device database registers, for each device model employed by one or more devices amongst the fleet of image forming devices, a firmware version and a release date corresponding to the firmware version, in association with the device model.

3. The device management apparatus as claimed in claim 1, wherein the device management apparatus provides, on demand, a user interface view showing device information of a specified device amongst the fleet of image forming devices, and the device information shown in the user interface view includes current firmware version installed in the specified device and a most recent version of the firmware that is available from the firmware source.

4. The device management apparatus as claimed in claim 1, wherein the notification transmitted to the device administrator specifying that the newer version of the specified firmware has been downloaded to the repository additionally indicates an update type of the newer version as one selected from Enhancement, Critical and Security.

5. The device management apparatus as claimed in claim 1, wherein the device management apparatus provides, on demand, a user interface view showing device information of a specified device amongst the fleet of image forming devices, and the user interface view also indicates whether a firmware update is available, and if a firmware update is available for the specified device, an additional user interface part is provided for scheduling the firmware update for the specified device.

6. The device management apparatus as claimed in claim 1, wherein the device management apparatus provides, on demand by the administrator, a user interface view showing device information of a specified device amongst the fleet of image forming devices, and the device information available in the user interface view includes current firmware version installed in the specified device and the release date associated with said current firmware version.

7. The device management apparatus as claimed in claim 1, wherein the device management apparatus generates and outputs, on demand, a user interface view showing, for each managed device amongst the fleet of image forming devices, information showing whether a current firmware version installed in the managed device is a most recent version of the firmware that is available from the firmware source, and when the current firmware version installed in the managed device is not the most recent version of the firmware that is available from the firmware source, the user interface view further includes an additional user interface part for scheduling a firmware update for the specified device.

8. The device management apparatus as claimed in claim 7, wherein when the information in the user interface view shows that the current firmware version installed in a specified device is not the most recent version of the firmware that is available from the firmware source, the user interface view further shows a version number of said most recent version and shows an update type of the firmware update as one selected from Enhancement, Critical and Security.

9. The device management apparatus as claimed in claim 1, wherein the scheduling page provided by the device management apparatus provides a user interface view showing, for each managed device for which a firmware update is available, information showing a current firmware version installed in the managed device and a most recent version of the firmware that is available from the firmware source, and an additional user interface part for scheduling the firmware update for the managed device.

10. The device management apparatus as claimed in claim 1, wherein the scheduling page provided by the device management apparatus upon activation of the link in the notification shows, for each device amongst the managed devices that employ the specified firmware for which the newer version is available, information showing a current firmware version installed in the device and a most recent version of the firmware that is available from the firmware source, and an additional user interface part for scheduling the firmware update for the managed device.

11. The device management apparatus as claimed in claim 1, wherein the scheduling page provided by the device management apparatus upon activation of the link in the notification includes a user interface part for scheduling the firmware update for only devices, amongst the managed devices that employ the specified firmware for which the newer version is available, that have not already had the firmware update performed thereon.

12. The device management apparatus as claimed in claim 1, wherein the device management apparatus generates and outputs, on demand, a firmware audit report indicating, for each managed device amongst the fleet of image forming devices, information showing whether a current firmware version installed in the managed device is a most recent version of the firmware that is available from the firmware source, and when the current firmware version installed in the managed device is not the most recent version of the firmware that is available from the firmware source, a version number of said most recent version and an update type of the firmware as one selected from Enhancement, Critical and Security.

13. The device management apparatus as claimed in claim 1, wherein the scheduling page provided by the device management apparatus upon activation of the link in the notification provides a list of the managed devices that employ the specified firmware, and for each device amongst the listed devices that employ the specified firmware, provides a corresponding user interface part to permit selection of the device for firmware update.

14. The device management apparatus as claimed in claim 1, wherein the scheduling page provided by the device management apparatus upon activation of the link in the notification permits the administrator to specify a date and time for the firmware update to selected devices amongst the managed devices that employ the specified firmware.

15. The device management apparatus as claimed in claim 1, wherein the newer version of the specified firmware includes a plurality of components, and the release notes in the notification includes, for each component amongst the plurality of component, remarks regarding the component of the newer version.

16. The device management apparatus as claimed in claim 1, wherein
the scheduling page provided by the device management apparatus permits the administrator to specify a date and time for applying the firmware update package that includes the selected components without any unselected components, to selected devices amongst the managed devices that employ the specified firmware.

17. A system in which plural devices are connected to a network, the system comprising:
a fleet of image forming devices;
a device database including a repository registering firmware downloaded for the fleet of image forming devices, the device database additionally registering firmware version information specifying, for each managed device amongst the fleet of image forming devices, the firmware and version thereof that is registered for the managed device; and
a device management apparatus that communicates with firmware sources through a network to determine whether newer versions of the firmware registered in the repository are available for download from the firmware sources,
wherein when the device management apparatus determines that a newer version of a specified registered firmware is available for download, the device management apparatus downloads said newer version of the specified registered firmware and release notes corresponding to said newer version, registers the newer version and the corresponding release notes in the repository, sends by electronic communication to a device administrator a notification specifying that the newer version of the specified firmware has been downloaded to the repository and providing the corresponding release notes and a link to a scheduling page to schedule a task to install the newer version on, amongst the fleet of image forming devices, one or more managed devices that employ the specified firmware, and
wherein when the newer version of the specified firmware includes a plurality of components, the scheduling page provided by the device management apparatus permits the administrator to select one or more components amongst the plurality of components while leaving one or more components amongst the plurality of components unselected and to create a firmware update package that includes the selected components to be deployed to selected devices amongst the managed devices that employ the specified firmware, without deploying any unselected components.

18. The system as claimed in claim 17, wherein
the device database registers, for each device model employed by one or more devices amongst the fleet of image forming devices, a firmware version and a release date corresponding to the firmware version, in association with the device model,
the firmware management module communicates with a firmware source of a specified registered firmware that was obtained from the firmware source, to determine a most recent version of the firmware available from the firmware source, and
the firmware management module compares the release date of the most recent version of the firmware with the release date associated with the registered firmware, to determine whether the most recent version of the firmware available from the firmware source is a newer version than the registered firmware registered in the repository.

19. A method performed by a device management apparatus configured for managing a fleet of image forming devices over a network, the method comprising:
(a) registering, in a device database, firmware downloaded for the fleet of image forming devices, the device database additionally registering firmware version information specifying, for each managed device amongst the fleet of image forming devices, the firmware and version thereof that is registered for the managed device;
(b) communicating by the device management apparatus with firmware sources through a network to determine whether newer versions of the firmware registered in the repository are available for download from the firmware sources;
(c) downloading by the device management apparatus, when the device management apparatus determines that a newer version of a specified registered firmware is available for download, said newer version of the specified registered firmware and release notes corresponding to said newer version, registering the newer version and the corresponding release notes in the repository, sending by the device management apparatus to a device administrator a notification specifying that the newer version of the specified firmware has been downloaded to the repository and providing the corresponding release notes and a link to a scheduling page to schedule a task to install the newer version on, amongst the fleet of image forming devices, one or more managed devices that employ the specified firmware; and
providing the scheduling page to permit the administrator, when the newer version of the specified firmware includes a plurality of components, to select one or more components amongst the plurality of components while leaving one or more components amongst the plurality of components unselected, and to create a firmware update package that includes the selected components to be deployed to selected devices amongst the managed devices that employ the specified firmware, without deploying any unselected components.

* * * * *